United States Patent Office 3,332,490
Patented July 25, 1967

3,332,490
AQUEOUS SOLUTIONS OF DEVITRIFIABLE GLASSES, METHODS OF USING, AND PRODUCTS THEREOF
Fred W. Burtch, Pitcairn, and John F. Muirhead, Aspinwall, Pa., assignors to Gulf Research & Development Company, Pittsburgh, Pa., a corporation of Delaware
No Drawing. Filed Dec. 21, 1964, Ser. No. 420,131
18 Claims. (Cl. 166—29)

This application is a continuation-in-part of Ser. No. 390,712, filed Aug. 19, 1964, now abandoned.

This invention relates to the consolidation or binding together of particulate matter and to a novel devitrified glass which may be used as the binding agent.

Particulate, granular, and powdered materials such as sand, powdered metals, and others are frequently bonded together to fulfill various requirements. A need exists for a bonding material which is resistant to adverse conditions such as high temperatures and to hot water for long periods of time and which is easily utilized in producing the bonded product. In accordance with this invention we have discovered a novel devitrifiable glass composition which is useful for bonding together particulate matter. An advantage of our glass formulation is that it is easily admixed with the particulate material in the form of a water solution and when properly dehydrated and heated it devitrifies to form a tightly adherent, strong, heat and water resistant bonded product. It is of particular advantage that the consolidation may readily be carried out to produce gas and liquid permeable materials generally useful, for example, in making objects such as filter elements, gas bubblers, sand cores for molding, and in the consolidation of incompetent oil well formations.

Oil bearing sand formations frequently break down and produce sand in the well bore as a result of insufficient cohesion between adjacent sand particles under the conditions prevailing in the well. These formations may break down during the drilling or well completion operations or they may produce sand when the well is brought into production as a combined effect of the stress created by the overburden and the flow velocity of the reservoir fluid. This represents a particular problem in sand formations in which there is inadequate natural cementing material to bind the sand grains together. Since the production of sand by the well fluid is very desirable, many attempts at solving this problem have been devised.

One method that has been used in incompetent formations is the placement of a slotted liner in the formation with gravel packing to hold back the sand particles. Another method involves the introduction of a substance into the incompetent formation adjacent to the well bore to supplement any naturally occurring cement and bind the sand particles together into a rigid but permeable formation. Somewhat severe requirements are placed upon this artificially introduced sand cementing material in order that the formation be adequately consolidated against the conditions which can reasonaly be anticipated in well preparation or during oil production. This cementing material must both form a strong bond with the individual sand grains as well as have an adequate internal strength. In order to be effective it must be capable of penetrating the formation a critical distance from the well bore and must not substantially decrease the formation permeability. Also for general utility it is desirable that this material be temperature and moisture resistant and withstand ordinary methods of well stimulation including resistance to hot gases, hot water, steam and treating acids.

Those methods which have been used in dealing with incompetent formations have presented a number of disadvantages. When slotted liners and gravel packing is used, it has been discovered that the sand particles or fines will migrate sufficiently to plug up the conducting channels. Sodium silicate or water glass has been suggested as a cementing substance, but it has been found that formations consolidated with this material disintegrate in the presence of hot water. The use of slurries or suspensions of cementing materials has been suggested, but we have demonstrated that these cannot be used with any but the rarely encountered, coarse grain, high permeability, unconsolidated formations because the suspended particles will filter off as a cake onto the surface of the formation without any effective penetration into the formation. We have ascertained that a true solution of cementing material rather than a suspension must be used for effective penetration of those unconsolidated formations usually encountered. When plastic resins have been used, it has been found that it is difficult either to establish adequate penetration or retain pereability with these substances. Further these resins disintegrate at relatively low temperatures.

In accordance with one aspect of our invention incompetent formations are consolidated with a substance which possesses the desirable attributes without the disadvantages of prior substances. We have discovered that incompetent formations can be consolidated by introducing a solution of a devitrifiable glass into the formation. After adequate penetration of the formation is achieved, the solvent is driven off and the formation is heated to a temperature sufficient to progressively cause the glass to flow over and wet the sand particles. Further heating causes a substantial devitrification of the glass. The resulting devitrified glass is tenaciously adherent to the sand particles and possesses high internal strength and a high resistance to hot gases, hot water, steam and high temperatures. The resulting consolidated formation possesses excellent permeability retention and compressive strength and remains consolidated when subjected to a variety of well production, stimulation and secondary recovery techniques.

The treating solution particularly useful in our consolidation process is a further aspect of our invention. A devitrifiable glass comprising a major amount of lead oxide and a minor amount of zinc oxide and boric oxide will form slurries in various organic liquids. Such slurries are useless with the usual sands of fine particle size due to the inability of the glass particles to penetrate into the interstices. In order to get easy penetration of a subsantial quantity of the glass a true solution is desired. We determined that these lead oxide-base glasses are slightly soluble, that is up to about two to four percent, in aqueous solutions of a lead acetate, sodium hydroxide, nitric acid, calcium chloride, sodium silicate as well as in aqueous solutions of other inorganic substances. Unexpectedly and contrary to logical expectations we have discovered that a water solution containing both sodium hydroxide and sodium silicate will completely dissolve up to about 15 percent of this glass and that a new devitrifiable glass formulation can be produced from this solute.

This new lead oxide-base glass melts at a relatively low temperature, thereby minimizing the heating problems for its devitrification and facilitating its general use including use in oil well consolidations. Upon melting, the glass possesses a sufficiently low viscosity that it flows onto and wets the sand grains. With further heating the glass gradually devitrifies and solidifies to a temperature and water resistant intergranular binding agent possessing excellent adhesive and cohesive characteristics against adverse conditions. An aggregate consolidated with this solution may retain as high as 70 or 80 percent of its original permeability and will withstand severe conditions. For example, an incompetent deep well formation can be subjected to rigorous stimulation or secondary recovery techniques without degradation of the bonding glass.

Glass may be defined as an inorganic product of fusion which has been cooled to a rigid condition without crystallization. It may be heated repeatedly to a molten condition without crystallization, being thermoplastic in nature. Although some glass compositions are known to crystallize to some extent at elevated temperatures, crystallization is generally avoided. As used herein devitrifiable glass refers to certain thermosetting glasses which will form a crystalline phase or skeleton such that the physical or thermal properties are determined by the crystalline phase. These glasses upon heating under proper conditions will be transformed into non-glassy, non-vitreous solids. Upon devitrification the glass may be substantially completely crystallized or it may contain some vitreous parent glass interspersed within the crystalline phase depending upon its composition and the conditions to which it is subjected. Devitrification of the glass increases its melting temperature to a substantial extent as compared with the predevitrification melting temperature. Those devitrifiable glass formulations having a major proportion of lead oxide are preferred by us for consolidation because of their relatively good water solubility and due to their favorable temperature characteristics.

It is preferred for successful consolidation according to our process that the glass first melt and wet the sand grains prior to the onset of crystallization. Some glass formulations will both melt and devitrify at the same temperature. In this instance it is essential that crystallization does not begin until a substantial period of time has elapsed after the glass has melted, otherwise premature devitrification with poor adhesion will likely result. For better control of the process it is desirable that the undevitrified glass formulation melt at a temperature below the temperature at which significant crystallization occurs. Formulations having a temperature spread of at least 50° F. and as high as 100° F. between melting and initiation of devitrification are preferred. With these glasses complete control can be exercised by controlling the rate of temperature rise prior to the onset of crystallization. It follows with respect to oil well consolidation that a decrease in the rate of temperature rise in the treated formation will result in an increase in the time between melting and the beginning of crystallization. If a down-hole heater is used, it may be operated at one temperature, or the temperature may be raised gradually or stepwise. However, under any procedure of heater operation the formation temperature will rise gradually with the rate being a function of the heater operation. The pattern of heater operation is not critical provided that the rate of formation temperature rise and therefore the time between melting and initiation of crystallization be controlled to suit the glass formulation being used.

It is desired for successful consolidation of the particulate material that the glass be substantially completely devitrified. This may be accomplished by heating at the devitrification temperature the requisite length of time or heating above the devitrification temperature for a shorter, appropriate period of time. Excessive heating at the devitrification temperature and higher does not adversely affect the glass, provided that it is recognized that there is an ultimate temperature at which a glass formulation will be adversely affected.

In making our treating solution we prefer to use a lead-zinc-borate type glass having from about 75 to 80 percent lead oxide, from about 10 to 15 percent zinc oxide and from about 6.5 to 10 percent boric oxide. Allowable additional property modifying constituents or impurities in amounts up to about 5 percent include aluminum oxide, silicon oxide, copper oxide, and antimony oxide. Since melting and devitrification rates and temperatures are quite sensitive to composition variations, it is important for effective utilization and consolidation that the final composition be selected with due care to the amount of the desired constituent and the identity and quantity of the impurities. We have discovered that a very useful composition is obtainable from Corning Glass Works, of Corning, N.Y. under their brand name, Pyroceram #95. This material by analysis is composed of 76.85 percent by weight lead oxide, 12.12 percent zinc oxide, 8.59 percent boric oxide and 2.44 percent silica. This glass melts at about 735° F. and devitrifies at about 825° F. when heated for about one hour.

A number of experiments were conducted using Pyroceram #95 to determine the preferred range of components in the treating solution. It was ascertained that solutions containing from about 5 to 15 percent of the lead oxide-base devitrifiable glass could be prepared in a solution containing from about 5 to 20 percent by weight of sodium hydroxide, from about 20 to 35 percent sodium silicate and about 40 to 55 percent water. Generally it is preferred that a treating solution in the higher lead oxide glass composition range be used for good consolidation. If too much glass is mixed with the solution, undissolved particles will settle out. A very suitable consolidation solution consists of 13.3 percent glass (Pyroceram #95), 28.9 percent sodium silicate (40°–42° Bé.), 8.9 percent sodium hydroxide and 48.9 percent water. After this specific solution has been applied to the aggregate of particulate matter to be consolidated and heated as described, the final composition of the resulting devitrified glass will be about 34 percent PbO, about 5.2 percent ZnO, about 3.7 percent $B_2O_3$, about 27 percent $SiO_2$, and about 30 percent $Na_2O$. The composition range of devitrified glasses resulting from our invention is from about 25 to 40 percent PbO, about 3.5 to 7 percent ZnO, about 2.5 to 6 percent $B_2O_3$, about 20 to 35 percent $SiO_2$, and about 20 to 35 percent $Na_2O$ with PbO, ZnO and $B_2O_3$ present in the relative proportions set forth above.

*Test No. 1*

A devitrifiable glass solution was formed by adding with stirring 30 gm. of Pyroceram #95 glass in the form of a finely divided powder to a solution at 70° F. containing 110 gm. of water, 65 gm. of sodium silicate, and 20 gm. of sodium hydroxide. A clear solution containing no undissolved solids resulted. Its composition was 10.2 percent by weight lead oxide, 1.60 percent zinc oxide, 1.14 percent boric oxide, .324 percent silicon dioxide, 28.9 percent sodium silicate, 8.9 percent sodium hydroxide and 48.9 percent water.

A steel tube measuring 18 inches in length and having an inner diameter of 2¼ inches was packed with cleaned dry 70 to 140 mesh Oklahoma #1 sand. The sand was saturated with the test solution at ambient temperature. An air flux of 24.8 M c.f./ft.$^2$/day was established and the sand was heated at a rate of 3.5° F. per minute to 1200° F. by electrical heaters surrounding the test cell. The system was maintained at 1200° F. for three hours under an average presure of 500 p.s.i.g. The resulting consolidated sand possessed a permeability of 6.7 darcys which represented 80 percent of the original packed sand permeability. The resulting consolidated cylinder of sand was sectioned into disks. A representative number of these sections were tested for compressive strength which was found to vary from 635 to 4400 p.s.i. with an average compressive strength of 1970 p.s.i. The higher compressive strengths came from disks near the air inlet end of the tube which was also the area of highest temperature. Another representative group of sections was sunbjected to boiling water for 5350 hours and these ranged in compressive strengths after treatment from 580 to 1580 p.s.i. with an average compressive strength of 1255 p.s.i.

Test No. 2

The same test as in Test No. 1 was repeated except the sand was heated for 10 hours at 1200 F. In this instance the average compressive strength was 3490 p.s.i. with compressive strengths ranging from 1060 to 6790 p.s.i. After exposing samples to boiling water for 5350 hours, the average compressive strength was 2880 p.s.i. and the range of compressive strengths was from 570 to 3840 p.s.i. It is noted that as the length of treating time was increased, a substantial improvement in resistance to boiling water resulted.

Test No. 3

Additional cleaned and dry Oklahoma #1 sand was packed into a 3½ foot long tube having an inner diameter of 5½ inches and saturated with the same solution as used in Test No. 1. A miniature version of a downhole burner was ignited and operated at 1200° F. The flow of hot burner gases was established at 61.6 M c.f./ft.$^2$/day with the system maintained at an average pressure of 500 p.s.i.g., and an average rate of temperature rise of 15.1° F. per minute. After two hours the run was stopped and the consolidated sand was sectioned and tested for compressive strength. The compressive strengths were comparable with those obtained in the prior runs. However, the samples disintegrated after 300 hours of exposure to boiling water.

Test No. 4

Test No. 3 was duplicated as closely as possible in all respects except that the treated sand was heated for six hours instead of two hours. The resulting compressive strength prior to hot water treatment was similar to Test No. 3. However, the sections showed an average compressive strength of 1150 p.s.i. with the strengths ranging from 550 to 1710 p.s.i. after being subjected to boiling water for 5400 hours. This indicates that the formation be heated for a length of time for adequate devitrification of the glass; the time being dependent on the glass formulation.

Test No. 5

The same tube, sand and treating solution as used in the prior two runs was used in this run. The burner was started at 800° F. and increased to 1000° F. and 1200° F. in steps to give an average temperature rise of 2.3° F. per minute in the sand. The hot gas flux was established at 66 M c.f./ft.$^2$/day and heating was continued for twelve hours. The samples of consolidated product demonstrated a compressive strength ranging from 1140 to 4580 p.s.i. with an average strength of 2600 p.s.i.

Test No. 6

Test No. 5 was repeated using a heating rate of 2.3° F. per minute except that the heating was terminated in four hours. The product in like manner exhibited a compressive strength ranging from 590 to 4160 p.s.i. with an average strength of 1880 p.s.i.

Test No. 7

Test No. 5 was repeated except that a heating rate was used to raise the temperature of the sand about 1.5° F. per minute with an overall heating cycle of four hours. The product, sampled as before, showed a compressive strength ranging from 1990 to 7650 p.s.i. with an average strength of 4040 p.s.i.

These experiments in conjunction with many additional experiments demonstrated that good sand consolidation can be obtained from aqueous solutions containing dissolved devitrifiable glass. The heating cycle used in effecting this consolidation is important to the quality of the consolidation. In general, the treated sand should be heated through the range at which the glass melts at a low rate of temperature rise to give superior consolidation. The best results were obtained for the specific formulation used in these tests when this rate was 1.5° F. per minute. It is believed that this results from the need for the devitrifiable glass to melt and wet the particles prior to the incidence of devitrification. Rapid heating with premature devitrification will result in poor adhesion. It was ascertained that superior consolidation generally resulted when devitrification was enhanced by a more lengthy heating at the devitrification temperature. We have further observed for superior consolidation as determined by compressive strength tests that the formation should be heated to a temperature for devitrification which is higher than the temperature at which the glass alone devitrifies.

The compressive strength of a sample of consolidated sand demonstrates the quality of consolidation under normal low temperature conditions. The boiling water tests evidence the materials' resistance both to water itself and to boiling water. Other experiments have successfully subjected consolidated sand to more than 7,000 hours in boiling water. Further it follows from the above experiments that the devitrified glass and the resulting consolidated product is stable to at least 1200° F. A sample of consolidated sand as produced in Test No. 2 was heated to red heat, reaching 2000° F. and immediately immersed in water at 70° F. There was no fracturing of the sample or measurable change in compressive strength indicating a significant high temperature stability. In these tests the permeability of the consolidated sand was in general about 80 percent of the initial permeability of the packed sand.

It is not necessary to start initially with a powdered glass formulation. For example, a solution was made by adding 289 gm. of sodium silicate, 89 gm. of sodium hydroxide, 106 gm. of lead oxide, 16 gm. of zinc oxide, and 11 gm. of boric oxide to 489 gm. of water. When treated in accordance with the procedures described above, Oklahoma #1 sand was well consolidated with this formulation.

Solutions of varying composition were produced. It was discovered that the solution would gel if the ratio of sodium silicate to sodium hydroxide is too large. Further, if the amount of these materials is too small insufficient glass is dissolved in the solution. Sodium hydroxide is preferred because of its ready availability and low cost, however, potassium hydroxide and lithium hydroxide may be used in substitution of part of the sodium hydroxide. Similarly although water glass or 40°–42° Bé. sodium silicate is preferred because of availability and moderate cost, solutions of sodium silicate of varying specific gravities as well as solutions of potassium silicate are useful herein provided that the proportion of the other constituents are adjusted accordingly. Furthermore, the constituents should be selected and proportioned that the alkali metal content of the final glass will be at least 50 mol percent $Na_2O$.

In order to compare our formulation with sodium silicate alone, a pack of 70–140 mesh sand was saturated with a 40°–42° Bé. solution of sodium silicate and set by in situ combustion with Yorba Linda crude oil. Good consolidation was obtained and the cementing material was stable in water for three days. However, when the sample was placed in boiling water, the cementing material dissolved out in less than twenty-four hours, evidencing an inadequate resistance to hot water and a significant difference in properties.

The particle size of the aggregate is not critical. It is a general rule that the bond strength between grains is inversely proportional to grain size. There is a limit to the larger sized particles but apparently no theoretical limit to the lower size particles that can be consolidated by our technique. Sand having a grain size as large as 4 mesh and as small as 200 mesh have been successfully consolidated.

Our bonding glass and method may be used in a great variety of applications. For example, consolidated disks similar to those produced in the above tests may be used as filter elements. Not only are these filter elements able to withstand adverse filtration conditions but, in addition, they can be rejuvenated periodically by burning off deposited solids at high temperatures. Also, reusable molds may be prepared in like manner. Porous metal casting molds made from fine sand permit uniform escape of all entrapped air through the mold yet will provide an essentially uniform smooth mold surface. Porous molds for producing relief maps are prepared by consolidating a batch of sand with one face possessing the configuration of the desired map. A flat plastic sheet map is then laid over the mold and heated as a small vacuum is placed upon the opposite face to draw the softened plastic against the mold. Small, durable gas bubblers may be easily made by consolidating fine sand or fritted glass in a similar manner.

In consolidating sand or other granular materials it is desirable that the grains be free of oily substances which could prevent wetting and good adhesion of the devitrifiable glass. If necessary in oil wells, the sand is pre-cleaned by heating the formation to a temperature sufficient to burn or drive off any residual oil. The downhole, fluid fuel burner described in F. M. Smith Patent No. 3,254,721 is very suitable for this purpose in oil well consolidation. The hot combustion gases are forced into the porous formation under pressure to sweep out the residual oil. Electrical down-hole heaters are less satisfactory for this purpose. The formation may also be freed of oil by injecting a solvent such as kerosene into the formation followed by the injection of a suitable surfactant solution to make the sand water-wettable.

This process is illustrated in the consolidation of a ten foot pay zone of an incompetent oil well formation at a depth of 4500 feet. The casing is perforated near the middle of the pay zone with a single point entry using a radial jet perforator. Gas permeability of the formation is established by injecting air into the formation. A Smith down-hole burner is positioned and operated for twelve hours at an exhaust temperature of 800° F. to burn the sand clean of oil around the casing notch. After shutting off the burner, the formation is cooled by the injection of twenty-five barrels of water. Air permeability is re-established and five barrels of treating solution of the formulation described in Test No. 1 is injected into the sand at a pressure insufficient to fracture the formation. Having a porosity of 30 percent, the formation will be saturated to a distance about three feet from the casing notch. Air is then injected displacing a part of the solution deeper into the formation and re-eastablishing permeability. The burner is re-ignited at a temperature of about 800° F. and the temperature is gradually increased to 1200° F. over a period of twelve hours to drive out the water of solution and melt the glass. Heating is continued for twenty-four hours at 1200 F. to effect substantially complete devitrification to a distance about three feet from the perforation. The burner is withdrawn and the well is purged of oxygen and put into production.

By this process the particles of an unconsolidated formation are stabilized into a sheath about the well casing of sufficient thickness and strength to prevent the migration of particles into the well bore or the breakdown of the formation under the stresses to which it is subjected. The devitrifiable glass since it is in solution will penetrate a substantial distance into any permeable formation in an adequate amount to effect the consolidation. Devitrification takes place at temperatures readily obtainable in bore holes yet once devitrification has occurred, the formation is stablized for production or against ordinary methods of stimulation or secondary recovery including hot water, steam, hot gases and in situ combustion. The devitrified glass possesses good adhesive and cohesive properties permitting good consolidation without a significant decrease in permeability.

The method and glass formulation disclosed herein is intended for general use to consolidate particulate matter including sand, pulverized glass, pulverized metals, ceramets such as tungsten carbide, asbestos, etc. for a variety of uses. The aggregate is restricted to substances which will not oxidize, melt or materially soften at the devitrification temperature, to those which are not reactive with the caustic treating solution, and to those which are wetted by the treating solution. Although it is of particular advantage in producing permeable products, it is not necessarily restricted thereto.

We claim:
1. A devitrified glass consisting essentially by weight of about 25 to 40 percent PbO, about 20 to 35 percent $SiO_2$, about 20 to 35 percent $Na_2O$, about 3.5 to 7.0 percent ZnO, and about 2.5 to 6.0 percent $B_2O_3$ with up to about 50 mol percent of said $Na_2O$ substituted with a member selected from $Li_2O$ and $K_2O$, together with incidental impurities and constituents that do not deleteriously affect the characteristics of the devitrified glass.

2. A devitrified glass consisting essentially by weight of about 35 percent PbO, about 5 percent ZnO, about 4 percent $B_2O_3$, about 28 percent $SiO_2$, and about 28 percent $Na_2O$.

3. A composition for use in the consolidation of particulate matter which comprises a true aqueous solution containing in said solution at least about 5 percent of a devitrifiable glass.

4. A composition for use in the consolidation of particulate matter which comprises an aqueous solution of a silicate selected from the class consisting of sodium silicate, potassium silicate, and mixtures thereof, an alkali metal hydroxide selected from the class consisting of lithium hydroxide, sodium hydroxide, potassium hydroxide, and mixtures thereof, and at least 5 percent by weight of a lead oxide-base devitrifiable glass.

5. A composition for use in the consolidation of particulate matter which consists essentially of about 5 to 15 percent of lead oxide, zinc oxide and boric oxide in the relative proportion of about 75 to 80 percent lead oxide, about 10 to 15 percent zinc oxide, and about 6.5 to 10 percent boric oxide; about 5 to 20 percent sodium hydroxide; about 20 to 35 percent sodium silicate; and the remainder water.

6. A composition for use in the preparation of a devitrifiable glass which consists essentially of about 29 percent sodium silicate, about 9 percent sodium hydroxide, about 10.5 percent lead oxide, about 1.6 percent zinc oxide, about 1.1 percent boric oxide, and the remainder water.

7. A consolidated aggregate comprising particulate material bound together with a matrix of a devitrified glass consisting essentially by weight of about 25 to 40 percent PbO, about 20 to 35 percent $SiO_2$, about 20 to 35 percent $Na_2O$, about 3.5 to 7.0 percent ZnO, and about 2.5 to 6.0 percent $B_2O_3$ with up to about 50 mol percent of said $Na_2O$ substituted with a member selected from $Li_2O$ and $K_2O$.

8. A consolidated aggregate in accordance with claim 7 which is permeable to gases and liquids.

9. A consolidated aggregate comprising particulate material having an average size no greater than about 4 mesh U.S. Standard Sieve Series bound together with a matrix of a devitrified glass consisting essentially by weight of about 35 percent PbO, about 5 percent ZnO, about 4 percent $B_2O_3$, about 28 percent $SiO_2$, and about 28 percent $Na_2O$.

10. A method of consolidating an aggregate of particulate material which comprises the steps of admixing an aqueous solution of a devitrifiable glass with said aggregate in intimate contact with the particles making up said aggregate, heating said aggregate to a first temperature whereby said glass is caused to melt and wet said particles, and heating said aggregate to a second temperature at which said glass devitrifies whereby said particles are bonded together and said aggregate is consolidated.

11. A method in accordance with claim 10 in which said glass is a lead oxide-base devitrifiable glass dissolved in an aqueous solution of a silicate selected from the class consisting of sodium silicate, potassium silicate, and mixtures thereof and an alkali metal hydroxide selected from the class consisting of lithium hydroxide, sodium hydroxide, potassium hydroxide and mixtures thereof.

12. A method in accordance with claim 10 in which said first temperature is in the range from about 800° F. up to about 1200° F. and said second temperature is at least about 1200° F.

13. A method of consolidating an aggregate of particulate material having an average particle size no larger than about 4 mesh U.S. Standard Sieve Series which comprises the steps of admixing an aqueous solution of a devitrifiable glass with said aggregate in intimate contact with the particles making up said aggregate, and heating said aggregate to, in order, drive off the water of solution, melt said glass and wet said particles, and devitrify said glass to bond together said particles into a gas and liquid permeable aggregate.

14. A method in accordance with claim 13 in which said solution consists essentially of about 5 to 15 percent of the group of lead oxide, zinc oxide and boric oxide in the relative proportion of about 75 to 80 percent lead oxide, about 10 to 15 percent zinc oxide, and about 6.5 to 10 percent boric oxide; about 5 to 20 percent sodium hydroxide; about 20 to 35 percent sodium silicate; and the remainder water.

15. A method for the consolidation of an aggregate of particulate material which comprises the steps of admixing an aqueous solution of a devitrifiable glass with said aggregate in intimate contact with the particles making up said aggregate, and heating said aggregate at a controlled rate to cause the temperature to rise in said aggregate through a temperature range in which said glass will, in order, drive off the water of solution, melt said glass and wet said particles, and devitrify said glass to bond said particles together into a gas and liquid permeable aggregate.

16. A method of consolidating incompetent oil-free, permeable formations adjacent to underground bore holes which comprises the steps of injecting a solution which consists essentially of a lead oxide-base devitrifiable glass dissolved in an aqueous solution of sodium silicate and sodium hydroxide into said formation, driving off said water of solution, heating said formation to a first temperature whereby said glass melts and wets the particles making up said formation, and heating said formation to a second temperature at which said glass devitrifies whereby said formation is consolidated.

17. A method of consolidating a substantially oil-free incompetent formation adjacent to an underground bore hole which comprises the steps of substantially saturating said formation with an aqueous solution of a devitrifiable glass, injecting air into said formation to establish permeability of said formation, heating said formation to a first temperature whereby said water of solution is driven off and said glass melts over the particles, and heating said formation to a second temperature at which said glass devitrifies to bond said particles together and consolidate said formation.

18. A method of consolidating an incompetent oil-bearing formation adjacent to underground bore holes which comprises the steps of heating said formation to free it of oil, cooling said formation, injecting an aqueous solution containing sodium silicate, sodium hydroxide and from about 5 to about 15 percent of a devitrifiable glass which consists essentially of a major proportion of lead oxide and a minor proportion of zinc oxide and boric oxide, injecting air into said formation to establish permeability of said formation, driving off the water of solution from said formation, heating said formation to a temperature between about 800° F. and 1200° F., and then heating said formation to at least about 1200° F. to cause devitrification of said glass and substantial consolidation of said formation.

References Cited

UNITED STATES PATENTS

| | | | |
|---|---|---|---|
| 2,889,952 | 6/1959 | Claypoole | 106—39 |
| 2,920,971 | 1/1960 | Stookey | 106—39 |
| 2,971,853 | 2/1961 | Stookey | 106—39 |
| 3,088,835 | 5/1963 | Pirooz | 106—39 |
| 3,180,098 | 4/1965 | Spencer | 106—287 |
| 3,205,946 | 9/1965 | Prats et al. | 106—25 |

CHARLES E. O'CONNELL, *Primary Examiner.*

JAMES A. LEPPINK, *Examiner.*